US008504117B2

(12) United States Patent
Fox

(10) Patent No.: US 8,504,117 B2
(45) Date of Patent: Aug. 6, 2013

(54) DE-NOISING METHOD FOR MULTI-MICROPHONE AUDIO EQUIPMENT, IN PARTICULAR FOR A "HANDS FREE" TELEPHONY SYSTEM

(75) Inventor: Charles Fox, Paris (FR)

(73) Assignee: Parrot, Paris (FR)

(*) Notice: Subject to any disclaimer, the term of this patent is extended or adjusted under 35 U.S.C. 154(b) by 0 days.

(21) Appl. No.: 13/489,214

(22) Filed: Jun. 5, 2012

(65) Prior Publication Data

US 2012/0322511 A1 Dec. 20, 2012

(30) Foreign Application Priority Data

Jun. 20, 2011 (FR) ..................................... 11 55377

(51) Int. Cl.
*H04B 1/38* (2006.01)

(52) U.S. Cl.
USPC .... 455/570; 455/63.1; 455/67.13; 455/114.2; 455/296; 455/501; 381/92; 704/233

(58) Field of Classification Search
USPC .................. 455/570, 63.1, 67.13, 114.2, 296, 455/501, 67.11, 67.7, 500, 511, 130, 135, 455/218-223, 226.1, 226.3, 233.1, 278.1, 455/283; 381/92, 17, 26, 57, 71.1-71.4, 71.8, 381/71.11, 71.12, 83, 86, 94.2, 94.7, 99, 381/43, 45-50; 704/233, 205, 225, 226, 275, 704/E15.039, E19.005, E21.002
See application file for complete search history.

(56) References Cited

U.S. PATENT DOCUMENTS 7,945,442 B2 * 5/2011 Zhang et al. .................. 704/233
7,953,596 B2 * 5/2011 Pinto ............................ 704/233
8,010,355 B2 * 8/2011 Rahbar ......................... 704/233
8,195,246 B2 * 6/2012 Vitte et al. .................... 455/570
8,370,140 B2 * 2/2013 Vitte et al. .................... 704/233

(Continued)

FOREIGN PATENT DOCUMENTS

EP 2309499 A1 6/2010

OTHER PUBLICATIONS

Hendriks, Richard et al., "On Optimal Multichannel Mean-Squared Error Estimators for Speech Enhancement", IEEE Service Center, vol. 16, No. 10, Oct. 1, 2009, pp. 885-888, ISSN:1070-9908.

(Continued)

*Primary Examiner* — Pablo Tran
(74) *Attorney, Agent, or Firm* — Haverstock & Owens LLP

(57) ABSTRACT

This method comprises the following steps in the frequency domain:

a) estimating a probability that speech is present;

b) estimating a spectral covariance matrix of the noise picked up by the sensors, this estimation being modulated by the probability that speech is present;

c) estimating the transfer functions of the acoustic channels between the source of speech and at least some of the sensors relative to a reference constituted by the signal picked up by one of the sensors, this estimation being modulated by the probability that speech is present;

d) calculating an optimal linear projector giving a single combined signal from the signals picked up by at least some of the sensors, from the spectral covariance matrix, and from the estimated transfer functions; and e) on the basis of the probability that speech is present and of the combined signal output from the projector, selectively reducing the noise by applying variable gain.

11 Claims, 2 Drawing Sheets

U.S. PATENT DOCUMENTS

| | | | | |
|---|---|---|---|---|
| 8,380,497 | B2 * | 2/2013 | Mohammad et al. | 704/226 |
| 2004/0002858 | A1 * | 1/2004 | Attias et al. | 704/226 |
| 2004/0150558 | A1 | 8/2004 | Li et al. | |
| 2007/0076898 | A1 * | 4/2007 | Sarroukh et al. | 381/92 |
| 2008/0120100 | A1 * | 5/2008 | Takeda et al. | 704/233 |
| 2009/0254340 | A1 * | 10/2009 | Sun et al. | 704/226 |
| 2012/0008802 | A1 * | 1/2012 | Felber | 381/107 |

OTHER PUBLICATIONS

Cohen, Israel et. al., "Speech Enhancement Based on a Microphone Array and Log-Spectral Amplitude Estimation", Proc. 22nd IEEE Convention of the Electrical and Electronic Engineers in Israel, Dec. 2002, pp. 1-3.

* cited by examiner

DE-NOISING METHOD FOR MULTI-MICROPHONE AUDIO EQUIPMENT, IN PARTICULAR FOR A "HANDS FREE" TELEPHONY SYSTEM

FIELD OF THE INVENTION

The invention relates to processing speech in a noisy environment.

The invention relates particularly, but in non-limiting manner, to processing speech signals picked up by telephony devices for use in motor vehicles.

BACKGROUND OF THE INVENTION

Such appliances comprise one or more microphones that are sensitive not only to the voice of the user, but that also pick up the surrounding noise together with the echoes due to the phenomenon of reverberation in the surroundings, typically the cabin of the vehicle. The useful component (i.e. the speech signal from the near speaker) is thus buried in an interfering noise component (external noise and reverberation) that can often make the speech of the near speaker incomprehensible for the remote speaker (i.e. the speaker at the other end of the channel over which the telephone signal is transmitted).

The same applies if it is desired to implement voice recognition techniques, since it is very difficult to implement shape recognition on words that are buried in a high level of noise.

This difficulty associated with surrounding noise is particularly constraining with "hands-free" devices. In particular, the large distance between the microphone and the speaker gives rise to a high relative level for noise, thereby making it difficult to extract the useful signal that is buried in the noise. Furthermore, the very noisy environment that is typical of a motor vehicle presents spectral characteristics that are not steady, i.e. that vary in unpredictable manner depending on driving conditions: driving over deformed road surfaces or cobbles, car radio in operation, etc.

Some such devices make provision for using a plurality of microphones and then taking the mean of the signals they pick up, or performing other operations that are more complex, in order to obtain a signal having a smaller level of disturbances.

In particular, so-called "beamforming" techniques enable software means to create directivity that serves to improve the signal/noise ratio. However, the performance of that technique is very limited when only two microphones are used (specifically, it is found that such a method provides good results only on the condition of using an array of at least eight microphones). Performance is also very degraded when the environment is reverberant.

OBJECT AND SUMMARY OF THE INVENTION

The object of the invention is to provide a solution for de-noising the audio signals picked up by such a multi-channel, multi-microphone system in an environment that is very noisy and very reverberant, typically the cabin of a car.

The main difficulty associated with the methods of speech processing by multi-channel systems is the difficulty of estimating useful parameters for performing the processing, since the estimators are strongly linked with the surrounding environment.

Most techniques are based on the assumption that the useful signal and/or the interfering noise presents a certain amount of directivity, and they combine the signals from the various microphones so as to improve the signal/noise ratio as a function of such directivity conditions.

Thus, EP 2 293 594 A1 (Parrot SA) describes a method of spatial detection and filtering of noise that is not steady and that is directional, such as a sounding horn, a passing scooter, an overtaking car, etc. The technique proposed consists in associating spatial directivity with the non-steady time and frequency properties so as to detect a type of noise that is usually difficult to distinguish from speech, and thus provide effective filtering of that noise and also deduce a probability that speech is present, thereby enabling noise attenuation to be further improved.

EP 2 309 499 A1 (Parrot SA) describes a two-microphone system that performs spatial coherence analysis on the signal that is picked up so as to determine a direction of incidence. The system calculates two noise references using different methods, one as a function of the spatial coherence of the signals as picked up (including non-directional non-steady noise) and another as a function of the main direction of incidence of the signals (including, above all, directional non-steady noise). That de-noising technique relies on the assumption that speech generally presents greater spatial coherence than noise and, furthermore, that the direction of incidence of speech is generally well-defined and can be assumed to be known: in a motor vehicle, it is defined by the position of the driver, with the microphones facing towards that position.

Nevertheless, those techniques are poor at taking account of the effect of the reverberation that is typical of a car cabin, in which numerous high-power reflections make it difficult to calculate an arrival direction, thereby having the consequence of considerably degrading the effectiveness of de-noising.

Furthermore, with those techniques, the de-noised signal obtained at the output reproduces the amplitude of the initial speech signal in satisfactory manner, but not its phase, which can lead to the voice as played back by the device being deformed.

The problem of the invention is to take account of a reverberant environment that makes it impossible to calculate an arrival direction of the useful signal in satisfactory manner, and also to obtain de-noising that reproduces both the amplitude and the phase of the initial signal, i.e. without deforming the speaker's voice when it is played back by the device.

The invention provides a technique that is implemented in the frequency domain on a plurality of bins of the signal that is picked up (i.e. on each frequency band of each time frame of the signal). The processing consists essentially in:

- calculating the probability that speech is present in the noisy signal as picked up;
- estimating the transfer functions of the acoustic channels between the speech source (the near speaker) and each of the sensors of the array of microphones;
- calculating an optimal projection for determining a single channel on the basis of the estimated transfer functions of the multiple channels; and
- selectively reducing noise in this single channel, for each bin, as a function of the probability that speech is present.

More precisely, the method of the invention is a de-noising method for a device having an array made up of a plurality of microphone sensors arranged in a predetermined configuration.

The method comprises the following processing steps in the frequency domain for a plurality of frequency bands defined for successive time frames of the signal:

a) estimating a probability that speech is present in the noisy signal as picked up;

b) estimating a spectral covariance matrix of the noise picked up by the sensors, this estimate being modulated by the probability that speech is present;

c) estimating the transfer functions of the acoustic channels between the speech source and at least some of the sensors, this estimation being performed relative to a reference useful signal constituted by the signal picked up by one of the sensors, and also being modulated by the probability that speech is present;

d) calculating an optimal linear projector giving a single de-noised combined signal derived from the signals picked up by at least some of the sensors, from the spectral covariance matrix estimated in step b), and from the transfer functions estimated in step c); and e) on the basis of the probability of speech being present and of the combined signal given by the projector calculated in step d), selectively reducing the noise by applying variable gain specific to each frequency band and to each time frame.

Preferably, the optimal linear projector is calculated in step d) by Capon beamforming type processing with minimum variance distorsionless response (MVDR).

Also preferably, the selective noise reduction of step e) is performed by processing of the optimized modified log-spectral amplitude (OM-LSA) gain type.

In a first implementation, the transfer function is estimated in step c) by calculating an adaptive filter seeking to cancel the difference between the signal picked up by the sensor for which the transfer function is to be evaluated and the signal picked up by the sensor of the reference useful signal, with modulation by the probability that speech is present.

The adaptive filter may in particular be of a linear prediction algorithm filter of the least mean square (LMS) type and the modulation by the probability that speech is present, may in particular be modulated by varying the iteration step size of the adaptive filter.

In a second implementation, the transfer function is estimated in step c) by diagonalization processing comprising:

c1) determining a spectral correlation matrix of the signals picked up by the sensors of the array relative to the sensor of the reference useful signal;

c2) calculating the difference between firstly the matrix determined in step c1), and secondly the spectral covariance matrix of the noise as modulated by the probability that speech is present, and as calculated in step b); and c3) diagonalizing the difference matrix calculated in step c2).

Furthermore, the signal spectrum for de-noising is advantageously subdivided into a plurality of distinct spectral portions; the sensors being regrouped as a plurality of subarrays, each associated with one of the spectral portions. The de-noising processing for each of the spectral portions is then performed differently on the signals picked up by the sensors of the subarray corresponding to the spectral portion under consideration.

In particular, when the array of sensors is a linear array of aligned sensors, the spectrum of the signal for de-noising may be subdivided into a low frequency portion and a high frequency portion. For the low frequency portion, the steps of the de-noising processing are then performed solely on the signals picked up by the furthest-apart sensors of the array.

In step c) it is also possible, still with a spectrum of the signal for de-noising that is subdivided into a plurality of distinct spectral portions, to estimate the transfer functions of the acoustic channels in different manners by applying different processing to each of the spectral portions.

In particular, when the array of sensors is a linear array of aligned sensors and when the sensors are regrouped into a plurality of subarrays, each associated with a respective one of the spectral portions: for the low frequency portion, the de-noising processing is performed solely on the signals picked up by the furthest-apart sensors of the array, and the transfer functions are estimated by calculating an adaptive filter; and for the high frequency portion, the de-noising processing is performed on the signals picked up by all of the sensors of the array, and the transfer functions are estimated by diagonalization processing.

BRIEF DESCRIPTION OF THE DRAWINGS

There follows a description of an embodiment of the device of the invention given with reference to the accompanying drawings in which the same numerical references are used from one figure to another to designate elements that are identical or functionally similar.

MORE DETAILED DESCRIPTION

There follows a detailed description of the de-noising technique proposed by the invention.

Figure 1:
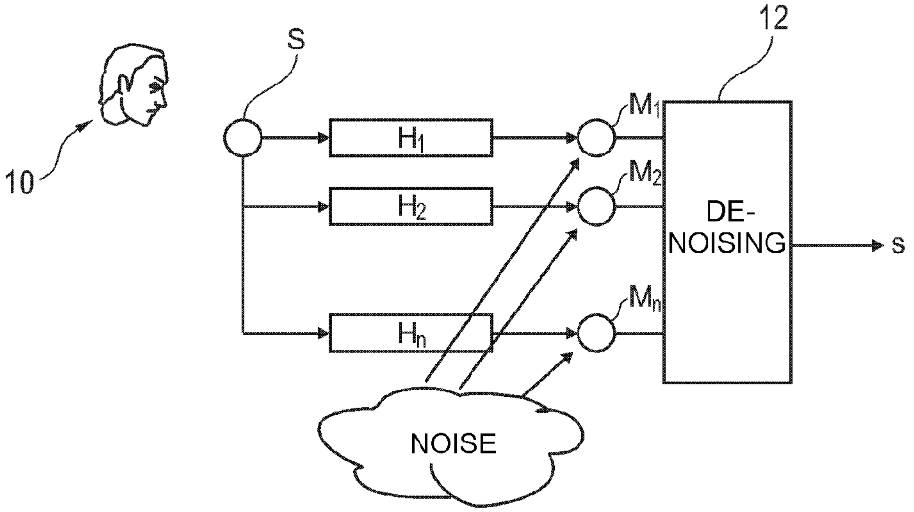
FIG. 1 is a diagram of the various acoustic phenomena involved in picking up noisy signals.

As shown in FIG. 1, consideration is given to a set of n microphone sensors, it being possible for each sensor to be considered as a single microphone $M_1, \ldots, M_n$ picking up a reverberated version of a speech signal uttered by a useful signal source S (the speech from a near speaker 10), which signal has noise added thereto.

Each microphone thus picks up:

- a component of the useful signal (the speech signal);
- a component of the reverberation of this speech signal as produced by the vehicle cabin; and
- a component of the surrounding interfering noise in all of its forms (directional or diffuse, steady or varying in unpredictable manner, etc.).

Modeling the Signals as Picked Up

The (multiple) signals from these microphones are to be processed by performing de-noising (block 12) so as to give a (single) signal as output: this is a single input multiple output (SIMO) model (from one speaker to multiple microphones).

The output signal should be as close as possible to the speech signal uttered by the speaker 10, i.e.:

- contain as little noise as possible; and
- deform the speaker's voice as played back at the output as little as possible.

For the sensor of rank i, the signal that is picked up is written as follows:

$$x_i(t)=h_i \otimes s(t)+b_i(t)$$

where $x_i$ is the signal as picked up, where $h_i$ is the impulse response between the useful signal source S and the sensor $M_i$, where s is the useful signal provided by the source S (the speech signal from the near speaker 10), and where $b_i$ is the additive noise.

For the set of sensors, it is possible to use vector notation:

$$x(t)=h\otimes s(t)+b(t)$$

$$X(\omega)=H(\omega)S(\omega)+B(\omega)$$

In the frequency domain, this expression becomes:

A first assumption is made that both the voice and the noise are centered Gaussian signals.

In the frequency domain, this leads to the following conditions, for all frequencies ω:

S is a centered Gaussian function of power $\phi_s$;

B is a centered Gaussian vector having a covariance matrix $R_n$; and

S and B are decorrelated, and each of them is decorrelated when the frequencies are different.

A second assumption is made that both the noise and the voice signals are decorrelated. This leads to the fact that S is decorrelated relative to all of the components of B. Furthermore, for different frequencies $\omega_i$ and $\omega_j$, $S(\omega_i)$ and $S(\omega_j)$ are decorrelated. This assumption is also valid for the noise vector B.

Calculating an Optimal Projector

On the basis of the elements set out above, the proposed technique consists in searching the time domain for an optimal linear projector for each frequency.

The term "projector" is used to designate an operator corresponding to transforming a plurality of signals picked up concurrently by a multi-channel device into a single single-channel signal.

This projection is a linear projection that is "optimal" in the sense that the residual noise component in the single-channel signal delivered as output is minimized (noise and reverberation are minimized), while the useful speech component is deformed as little as possible.

This optimization involves searching, at each frequency, for a vector A such that:

the projection $A^TX$ contains as little noise as possible, i.e. the power of the residual noise, given by $E[A^TVV^TA]=A^TR_nA$ is minimized; and the speaker's voice is not deformed, which is represented by the following constraint $A^TH=1$;

where:

$R_n$ is the correlation matrix between the frequencies for each frequency; and

H is the acoustic channel under consideration.

This problem is a problem of optimization under constraint, i.e. searching for $\min(A^TR_nA)$ under the constraint $A^TH=1$.

It may be solved by using the Lagrange multiplier method, which gives the following solution:

$$A^T=\frac{H^TR_n^{-1}}{H^TR_n^{-1}H}$$

When the transfers H correspond to a pure delay, this can be seen to be the minimum variance distorsionless response (MVDR) beamforming formula, also known as Capon beamforming.

After projection, it should be observed that the residual noise power is given by:

$$\frac{1}{H^TR_n^{-1}H}$$

Furthermore, by writing minimum mean square error type estimators for the amplitude and the phase of the signal at each frequency, it can be seen that the estimators are written as Capon beamforming followed by single-channel processing, as described in:

[1] R. C. Hendriks et al., *On optimal multichannel mean-squared error estimators for speech enhancement*, IEEE Signal Processing Letters, Vol. 16, No 10, 2009.

The selective de-noising processing of the noise applied to the single-channel signal that results from the beamforming processing is advantageously processing of the type having optimized modified log-spectral amplitude gain as described, for example, in:

[2] I. Cohen, *Optimal Speech Enhancement Under Signal Presence Uncertainty Using Log-Spectral Amplitude Estimator*, IEEE Signal Processing Letters, Vol. 9, No. 4, pp. 113-116, April 2002.

Parameter Estimation for Calculating the Optimal Linear Projector

In order to implement this technique, it is necessary to estimate the acoustic transfer functions $H_1, H_2, \ldots, H_n$ between the speech source S and each of the microphones $M_1, M_2, \ldots, M_n$.

It is also necessary to estimate the spectral noise covariance matrix, written $R_n$.

For these estimates, use is made of a probability value for the presence of speech, which value is written p.

The probability that speech is present is a parameter that may take a plurality of different values lying in the range 0 to 100% (and not merely a binary value 0 or 1). This parameter is calculated by a technique that is itself known, with examples of such techniques being described in particular in:

[3] I. Cohen et B. Berdugo, *Two-Channel Signal Detection and Speech Enhancement Based on the Transient Beam-to-Reference Ratio*, Proc. ICASSP 2003, Hong-Kong, pp. 233-236, April 2003.

Reference may also be made to WO 2007/099222 A1, which describes a de-noising technique implementing a calculation of the probability that speech is present.

Concerning the spectral noise covariance matrix $R_n$, it is possible to use an expectation estimator having an exponential window, which amounts to applying a forgetting factor:

$$R_n(k+1)=\alpha R_n(k)+(1-\alpha)XX^T$$

where:

k+1 is the number of the current frame; and

α is a forgetting factor lying in the range 0 to 1.

In order to take account only of elements where only noise is present, the forgetting factor α is modulated by the probability of speech being present:

$$\alpha=\alpha_0+(1-\alpha_0)p$$

where $\alpha_0 \in [01]$.

Several techniques can be used to estimate the transfer function H of the acoustic channel under consideration.

A first technique consists in using an algorithm of the least mean square (LMS) type in the frequency domain.

Algorithms of the LMS type—or of the normalized LMS (NLMS) type, which is a normalized version of the LMS type—are algorithms that are relatively simple and not very greedy in terms of calculation resources. These algorithms are themselves known, as described for example in:

[4] B. Widrow, *Adaptative Filters, Aspect of Network and System Theory*, R. E. Kalman and N. De Claris Eds., New York: Holt, Rinehart and Winston, pp. 563-587, 1970;

[5] J. Prado and E. Moulines, *Frequency-domain adaptive filtering with applications to acoustic echo cancellation*, Springer, Ed. Annals of Telecommunications, 1994;

[6] B. Widrow and S. Stearns, *Adaptative Signal Processing*, Prentice-Hall Signal Processing Series, Alan V. Oppenheim Series Editor, 1985.

Figure 2:
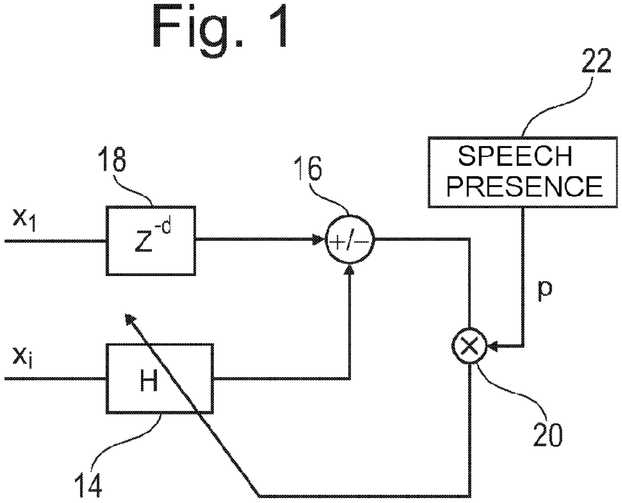
FIG. 2 is a block diagram of an adaptive filter for estimating the transfer function of an acoustic channel.

The principle of this algorithm is shown in FIG. 2.

In a manner characteristic of the invention, one of the channels is used as a reference useful signal, e.g. the channel from the microphone $M_1$, and the transfer functions $H_2, \ldots, H_n$ are calculated for the other channels.

This amounts to applying the constraint $H_1=1$.

It should clearly be understood that the signal taken as the reference useful signal is the reverberated version of the speech signal S picked up the microphone $M_1$ (i.e. a version with interference), where the presence of reverberation in the signal as picked up not being an impediment since at this stage it is desired to perform de-noising and not de-reverberation.

As shown in FIG. 2, the LMS algorithm seeks (in known manner) to estimate a filter H (block 14) by means of an adaptive algorithm corresponding to the signal $x_i$ delivered by the microphone $M_i$, by estimating the transfer of noise between the microphone $M_i$ and the microphone $M_1$ (taken as the reference). The output from the filter 14 is subtracted at 16 from the signal $x_1$ as picked up by the microphone $M_1$ in order to give a prediction error signal enabling the filter 14 to be adapted iteratively. It is thus possible, on the basis of the signal $x_i$ to predict the (reverberated) speech component contained in the signal $x_1$.

In order to avoid problems associated with causality (in order to be sure that the signals $x_i$ do not arrive ahead of the reference signal $x_1$), the signal $x_1$ is delayed a little (block 18).

Furthermore, an element 20 is added for weighting the error signal from the adaptive filter 14 with the probability p of speech being present as delivered at the output from the block 22: this consists in adapting the filter only while the probability of speech being present is high. This weighting may be performed in particular by modifying the adaptation step size as a function of the probability p.

The equation for updating the adaptive filter is written, for each frame k and for each sensor i, as follows:

$$H_i(k+1)=H_i(k)+\mu X(k)_1{}^T(X(k)_1-H(k)_i X(k)_i)$$

The adaptation step size μ of the algorithm, as modulated by the probability of speech being present, is written as follows, while normalizing the LMS (the denominator corresponding to the spectral power of the $$\mu = \frac{p}{E[X_1^2]}$$

signal $x_1$ at the frequency under consideration):

The assumption that noise is decorrelated leads to the LMS algorithm projecting voice and not noise such that the estimated transfer function does indeed correspond to the acoustic channel H between the speaker and the microphones.

Another possible technique for estimating the acoustic channel consists in diagonalizing the matrix.

This estimation technique is based on using the spectral correlation matrix of the observed signal, written as follows:

$$R_x=E[XX^T]$$

This matrix is estimated in the same manner as $R_n$:

$$R_n(k+1)=\alpha R_n(k)+(1-\alpha)XX^T$$

where α is a forgetting factor (a constant factor since account is taken of the entire signal).

It is then possible to estimate:

$$R_x-R_n=\phi_s HH^T$$

this is a matrix of rank 1 for which the only non-zero eigenvalue is $\phi_s$, which is associated with the eigenvector H.

It is thus possible to estimate H by diagonalizing $R_x-R_n$, but it is only possible to calculate vect(H) in other words H is estimated only to within a complex factor.

In order to lift this ambiguity, and in the same manner as described above for estimation by the LMS algorithm, one of the channels is selected as a reference channel, which amounts to applying the constraint $H_1=1$.

Spatial Sampling of the Sound Field

With a multi-microphone system, i.e. a system that performs spatial sampling of the sound field, the relative placing of the various microphones is an element that is crucial for the effectiveness of the processing of the signals picked up by the microphones.

In particular, as stated in the introduction, it is assumed that the noise present at the microphones is decorrelated, so as to be able to use an adaptive identification of the LMS type. To come closer to this assumption, it is appropriate to space the microphones apart from one another since, for a diffuse noise model, the correlation function is written as a function that decreases with decreasing distance between the microphones, thereby making the acoustic channel estimators more robust.

The correlation between two sensors for a diffuse noise field is written as follows:

$$MSC(f) = \text{sinc}^2\left(\frac{fd}{c}\right)$$

where:

f is the frequency under consideration;

d is the distance between the sensors, and c is the speed of sound.

Figure 3:
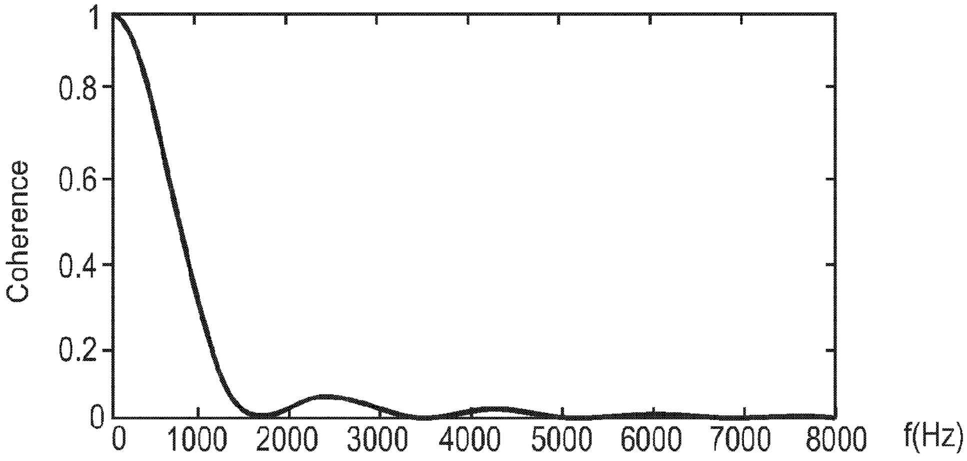
FIG. 3 is a characteristic showing variations in the correlation between two sensors for a diffuse noise field, plotted as a function of frequency.

The corresponding characteristic is shown in FIG. 3 for a distance between the microphones d=10 centimeters (cm).

Having the microphones spaced apart, thereby decorrelating noise, nevertheless presents the drawback of giving rise in the space domain to sampling at a smaller frequency, with the consequence of aliasing at high frequencies, which frequencies are therefore played back less well.

The invention proposes solving this difficulty by selecting different sensor configurations depending on the frequencies being processed.

Figure 4:
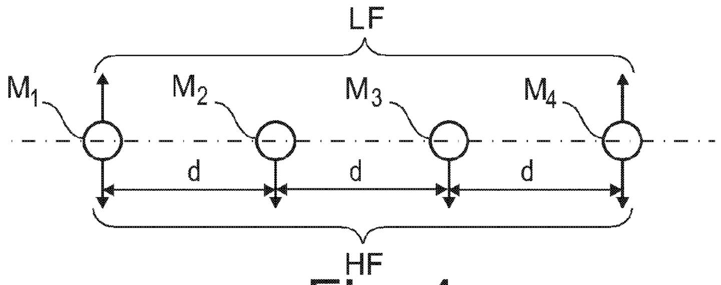
FIG. 4 is a diagram of an array of four microphones suitable for use in selective manner as a function of frequency for implementing the invention.

Thus, in FIG. 4, there is shown a linear array of four microphones $M_1, \ldots, M_4$ in alignment, the microphones being spaced apart from one another by d=5 cm.

For the lower region of the spectrum (low frequencies (LF)), it may be appropriate, for example, to use only the two furthest-apart microphones $M_1$ and $M_4$ that are thus spaced apart by 3d=15 cm, whereas for the high frequency portion of the spectrum (high frequencies (HF)) all four microphones $M_1$, $M_2$, $M_3$, and $M_4$ should be used, with a spacing of only d=5 cm.

In a variant, or in addition, in another aspect of the invention, it is also possible, when estimating the transfer function H of the acoustic channel, to select different methods as a function of the frequencies being processed. For example, for the two methods described above (frequency processing by LMS and processing by diagonalization), it is possible to select one method or the other as a function of criteria such as:

- the correlation of the noise: in order to take account of the tact that the diagonalizing method is less sensitive thereto, although less accurate; and
- the number of microphones used: in order to take account of the fact that the diagonalization method becomes very expensive in terms of calculation when the dimension of the matrices increases, as a result of increasing the number n of microphones.

Description of a Preferred Implementation

This example is described with reference to FIGS. 5 and 6 and implements the various elements mentioned above for processing the signals, with their various possible variants.

Figure 5:
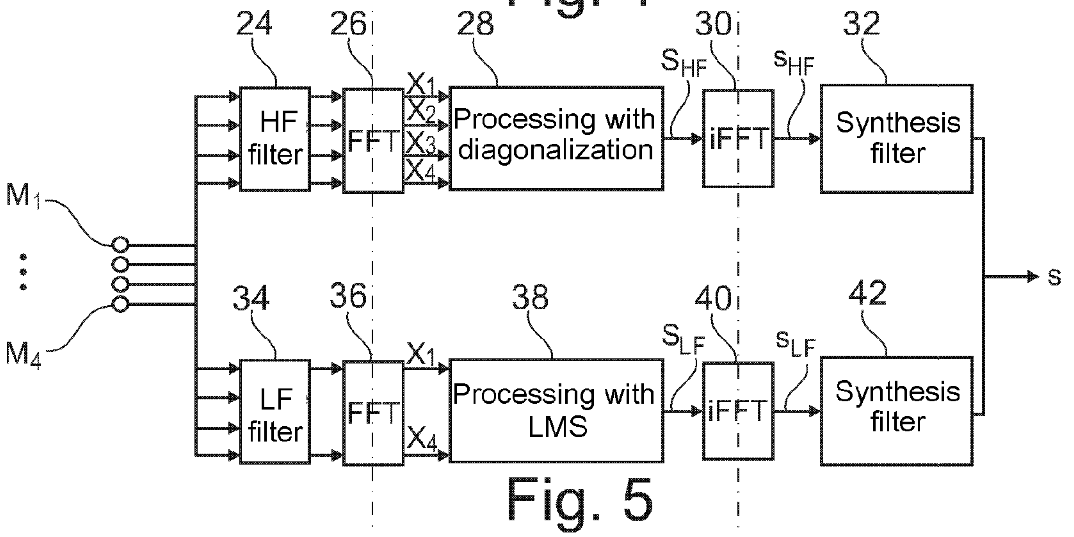
FIG. 5 is an overall block diagram showing the various kinds of processing performed in the invention in order to de-noise signals picked up by the FIG. 4 array of microphones.

FIG. 5 is a block diagram shown the various steps in the processing of the signals from a linear array of four microphones $M_1, \ldots, M_4$, such as that shown in FIG. 4.

Different processing is performed for the high spectrum (high frequencies HF, corresponding to blocks 24 to 32) and for the low spectrum (low frequencies LF, corresponding to blocks 34 to 42):

- for the high spectrum, selected by a filter 24, the signals from the four microphones $M_1, \ldots, M_4$ are used jointly. These signals are first subjected to a fast Fourier transform (FFT) (block 26) in order to pass into the frequency domain, and they are then subjected to processing 28 involving matrix diagonalization (and described below with reference to FIG. 6). The resulting single-channel signal $S_{HF}$ is subjected to an inverse fast Fourier transform (iFFT) (block 30) in order to return to the time domain, and then the resulting signal $s_{HF}$ is applied to a synthesis filter (block 32) in order to restore the high spectrum of the output channel s; and
- for the low spectrum, selected by the filter 34, only the signals from the two furthest-apart microphones $M_1$ and $M_4$ are used. These signals are initially subjected to an FFT (block 36) in order to pass into the frequency domain, followed by processing 38 involving adaptive LMS filtering (and described below with reference to FIG. 6). The resulting single-channel signal $S_{LF}$ is subjected to an iFFT (block 40) in order to return to the time domain, and then the resulting signal $s_{LF}$ is applied to a synthesis filter (block 42) in order to restore the low spectrum of the output channel s.

Figure 6:
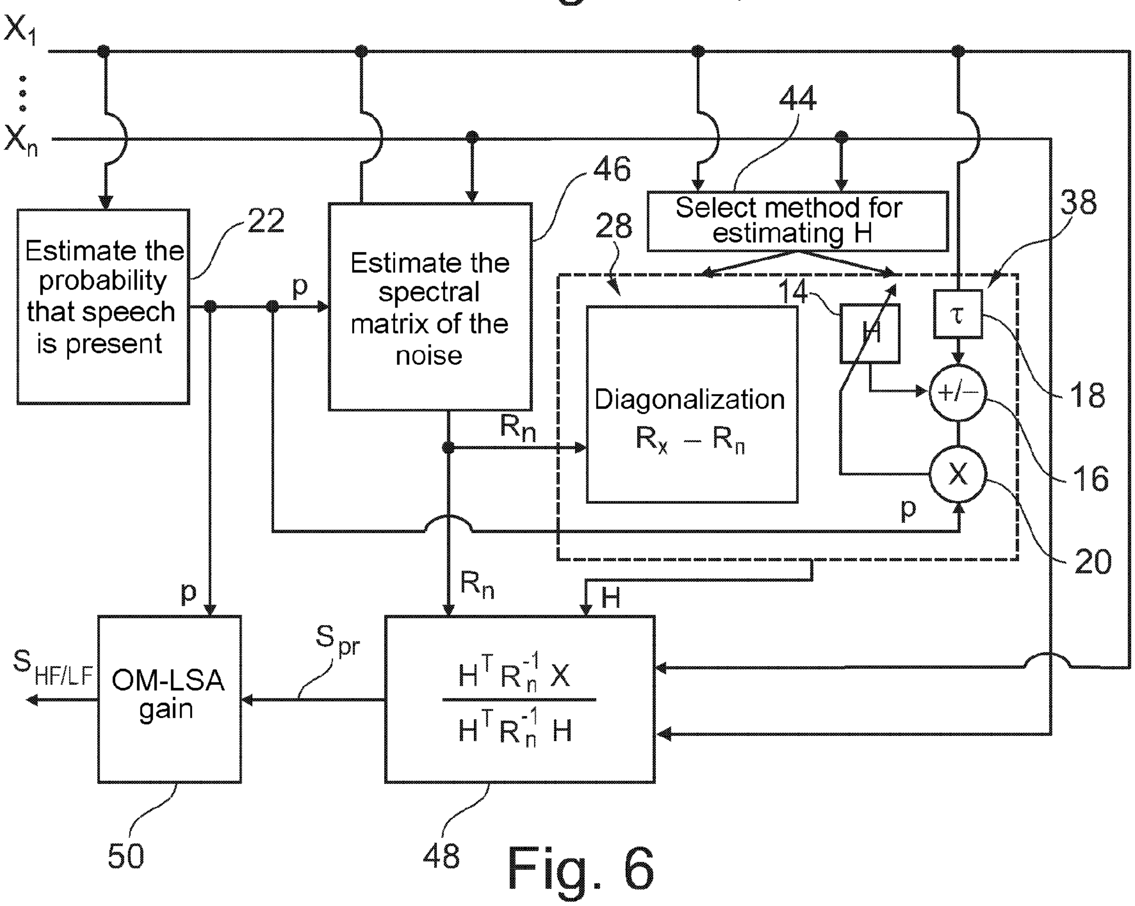
FIG. 6 is a block diagram showing in greater detail the functions implemented in the frequency domain in the processing of the invention as shown in FIG. 5.

With reference to FIG. 6, there follows a description of the processing performed by the blocks 28 or 38 in FIG. 5.

The processing described below is applied in the frequency domain to each frequency bin, i.e. for each frequency band defined for the successive time frames of the signal picked up by the microphones (all four microphones $M_1$, $M_2$, $M_3$, and $M_4$ for the high spectrum HF, and the two microphones $M_1$ and $M_4$ for the low spectrum LF).

In the frequency domain, these signals correspond to the vectors $X_1, \ldots, X_n$ ($X_1$, $X_2$, $X_3$, and $X_4$ or $X_1$ and $X_4$, respectively).

A block 22 uses the signals picked up by the microphones to produce a probability p that speech is present. As mentioned above, this estimate is made using a technique that is itself known, e.g. the technique described in WO 2007/099222 A1, to which reference may be made for further details.

The block 44 represents a selector for selecting the method of estimating the acoustic channel, either by diagonalization on the basis of the signals picked up by all of the microphones $M_1$, $M_2$, $M_3$, and $M_4$ (block 28 in FIG. 5, for the high spectrum HF), or by an LMS adaptive filter on the basis of the signals picked up by the two furthest-apart microphones $M_1$ and $M_4$ (block 38 in FIG. 5, for the low spectrum LF).

The block 46 corresponds to estimating the spectral noise matrix, written $R_n$ used for calculating the optimal linear projector, and also used for the diagonalization calculation of block 28 when the transfer function of the acoustic channel is estimated in that way.

The block 48 corresponds to calculating the optimal linear projector. As mentioned above, the projection calculated at 48 is a linear projection that is optimal in the sense that the residual noise component in the single-channel signal delivered at the output is minimized (noise and reverberation).

As also mentioned above, the optimum linear projector presents the feature of resetting the phases of the various input signals, thereby making it possible to obtain a projected signal $S_{pr}$ at the output in which the phase (and naturally also the amplitude) of the initial speech signal from the speaker is to be found.

The final step (block 50) consists in selectively reducing the noise by applying a variable gain to the projected signal $S_{pr}$, the variable gain being specific to each frequency band and for each time frame.

The de-noising is also modulated by the probability p that speech is present.

The signal $S_{HF/LF}$ output by the de-noising block 50 is then subjected to an iFFT (blocks 30 and 40 of FIG. 5) in order to obtain the looked-for de-noised speech signal $s_{HF}$ or $s_{LF}$ in the time domain, thereby giving the final de-noised speech signal s after reconstituting the entire spectrum.

The de-noising performed by the block 50 may advantageously make use of a method of the OM-LSA type such as that described in the above-mentioned reference:

[2] I. Cohen, *Optimal Speech Enhancement Under Signal Presence Uncertainty Using Log-Spectral Amplitude Estimator*, IEEE Signal Processing Letters, Vol. 9, No 4, April 2002.

Essentially, applying a so-called "log-spectral amplitude" gain serves to minimize the mean square distance between the logarithm of the amplitude of the estimated signal and the logarithm of the amplitude of the original speech signal. This second criterion is found to be better than the first, since the selected distance is a better match to the behavior of the human ear and therefore gives results that are qualitatively better. In any event, the essential idea is to reduce the energy of the frequency components subjected to a large amount of interference by applying low gain thereto, while nevertheless leaving intact those frequency components that have little or no interference (by applying a gain of 1 thereto).

The OM-LSA algorithm improves the calculation of the LSA gain to be applied by weighting it with the conditional probability p that speech is present.

In this method, the probability p that speech is present is involved at two important levels:

- when estimating the energy of the noise, the probability modulates the forgetting factor so as to update the estimate of the noise in the noisy signal more quickly when the probability that speech is present is low; and
- when calculating the final gain, the probability also plays an important role, since the amount of noise reduction that is applied increases (i.e. the gain that is applied decreases) with decreasing probability that speech is present.

What is claimed is:

1. A method of de-noising a noisy acoustic signal for a multi-microphone audio device operating in noisy surroundings, in particular a "hands-free" telephone device, the noisy acoustic signal comprising a useful component coming from a speech source and an interfering noise component, said device comprising an array of sensors forming a plurality of microphone sensors arranged in a predetermined configuration and suitable for picking up the noisy signal, wherein the method comprises the following processing steps in the frequency domain for a plurality of frequency bands defined for successive time frames of the signal:

a) estimating a probability that speech is present in the noisy signal as picked up;

b) estimating a spectral covariance matrix of the noise picked up by the sensors, this estimate being modulated by the probability that speech is present;

c) estimating the transfer functions of the acoustic channels between the speech source and at least some of the sensors, this estimation being performed relative to a reference useful signal constituted by the signal picked up by one of the sensors, and also being modulated by the probability that speech is present;

d) calculating an optimal linear projector giving a single de-noised combined signal derived from the signals picked up by at least some of the sensors, from the spectral covariance matrix estimated in step b), and from the transfer functions estimated in step c); and e) on the basis of the probability of speech being present and of the combined signal given by the projector calculated in step d), selectively reducing the noise by applying variable gain specific to each frequency band and to each time frame.

2. The method of claim 1, wherein the optimal linear projector is calculated in step d) by Capon beamforming type processing with minimum variance distorsionless response.

3. The method of claim 1, wherein the selective noise reduction of step e) is performed by processing of the optimized modified log-spectral amplitude gain type.

4. The method of claim 1, wherein the transfer function is estimated in step c) by calculating an adaptive filter seeking to cancel the difference between the signal picked up by the sensor for which the transfer function is to be evaluated and the signal picked up by the sensor of said reference useful signal, with modulation by the probability that speech is present.

5. The method of claim 4, wherein the adaptive filter is of a linear prediction algorithm filter of the least mean square (LMS) type.

6. The method of claim 4, wherein said modulation by the probability that speech is present is modulation by varying the iteration step size of the adaptive filter.

7. The method of claim 1, wherein the transfer function is estimated in step c) by diagonalization processing comprising:

c1) determining a spectral correlation matrix of the signals picked up by the sensors of the array relative to the sensor of said reference useful signal;

c2) calculating the difference between firstly the matrix determined in step c1), and secondly said spectral covariance matrix of the noise as modulated by the probability that speech is present, and as calculated in step b); and c3) diagonalizing the difference matrix calculated in step c2).

8. The method of claim 1, wherein:

the signal spectrum for de-noising is subdivided into a plurality of distinct spectral portions;

the sensors are regrouped as a plurality of subarrays, each associated with one of said spectral portions; and the de-noising processing for each of said spectral portions is performed differently on the signals picked up by the sensors of the subarray corresponding to the spectral portion under consideration.

9. The method of claim 8, wherein:

the array of sensors is a linear array of aligned sensors;

the spectrum of the signal for de-noising is subdivided into a low frequency portion and a high frequency portion; and for the low frequency portion, the steps of the de-noising processing are performed solely on the signals picked up by the furthest-apart sensors of the array.

10. The method of claim 1, wherein:

the spectrum of the signal for de-noising is subdivided into a plurality of distinct spectral portions; and step c) of estimating the transfer functions of the acoustic channels is performed differently by applying different processing to each of said spectral portions.

11. The method of claim 10, wherein:

the array of sensors is a linear array of aligned sensors;

the sensors are regrouped into a plurality of subarrays, each associated with a respective one of said spectral portions;

for the low frequency portion, the de-noising processing is performed solely on the signals picked up by the furthest-apart sensors of the array, and the transfer functions are estimated by calculating an adaptive filter; and for the high frequency portion, the de-noising processing is performed on the signals picked up by all of the sensors of the array, and the transfer functions are estimated by diagonalization processing.

* * * * *